(12) United States Patent
Bostick et al.

(10) Patent No.: US 10,255,808 B2
(45) Date of Patent: *Apr. 9, 2019

(54) DETERMINING A PARKING POSITION BASED ON VISUAL AND NON-VISUAL FACTORS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,588

(22) Filed: Mar. 13, 2018

(65) Prior Publication Data

US 2018/0204457 A1 Jul. 19, 2018

Related U.S. Application Data

(63) Continuation of application No. 15/586,573, filed on May 4, 2017, now Pat. No. 9,953,531, which is a
(Continued)

(51) Int. Cl.
*G08G 1/14* (2006.01)
*G06K 9/00* (2006.01)
(Continued)

(52) U.S. Cl.
CPC .......... *G08G 1/143* (2013.01); *B62D 15/0285* (2013.01); *G06K 9/00812* (2013.01); *G06K 2209/23* (2013.01); *G08G 1/0175* (2013.01)

(58) Field of Classification Search
CPC .................. G08G 1/143; G06K 9/00812
(Continued)

(56) References Cited

U.S. PATENT DOCUMENTS 7,295,227 B1 * 11/2007 Asahi ................... B60R 1/00
348/118
7,706,944 B2 * 4/2010 Tanaka ............... B62D 15/028
180/199
(Continued)

FOREIGN PATENT DOCUMENTS

CN 203543801 4/2014
CN 103879352 6/2014
(Continued)

OTHER PUBLICATIONS

Alasaadi et al., "ParkZoom: A Parking Spot Identification System", International IEEE Annual Conference on Intelligent Transportation Systems, Oct. 6-9, 2013; pp. 702-707.
(Continued)

*Primary Examiner* — Jack K Wang
(74) *Attorney, Agent, or Firm* — Brian Restauro; Andrew M. Calderon; Roberts Mlotkowski Safran Cole & Calderon, P.C.

(57) ABSTRACT

A computer-implemented method includes: receiving, by a computing device, images of adjacent vehicles parked directly adjacent to an open parking space; determining, by the computing device, visual factors and non-visual factors of the adjacent vehicles based on the images; determining, by the computing device, risk scores for each of the adjacent vehicles based on the visual factor and the non-visual factors; determining, by the computing device, a parking position within the open parking space based on the risk scores; and outputting, by the computing device, information regarding the parking position.

20 Claims, 8 Drawing Sheets

Related U.S. Application Data continuation of application No. 14/851,546, filed on Sep. 11, 2015, now Pat. No. 9,679,485.

(51) Int. Cl.
*B62D 15/02* (2006.01)
*G08G 1/017* (2006.01)

(58) Field of Classification Search
USPC ........................................ 340/932.2
See application file for complete search history.

(56) References Cited

U.S. PATENT DOCUMENTS

| | | | |
|---|---|---|---|
| 7,920,070 B2* | 4/2011 | Chen | B62D 15/0285 340/435 |
| 8,299,942 B2 | 10/2012 | Ko et al. | |
| 9,679,485 B2 | 6/2017 | Bostick et al. | |
| 2003/0151526 A1* | 8/2003 | Tanaka | B60Q 9/004 340/932.2 |
| 2003/0156045 A1* | 8/2003 | Tanaka | B60Q 9/004 340/932.2 |
| 2006/0287826 A1* | 12/2006 | Shimizu | B60K 35/00 701/431 |
| 2008/0077294 A1 | 3/2008 | Danz et al. | |
| 2009/0174574 A1 | 7/2009 | Endo et al. | |
| 2009/0243888 A1* | 10/2009 | Kawabata | B62D 15/028 340/932.2 |
| 2011/0143779 A1 | 6/2011 | Rowe et al. | |
| 2011/0210868 A1 | 9/2011 | Yano et al. | |
| 2012/0072067 A1 | 3/2012 | Jecker et al. | |
| 2012/0078686 A1 | 3/2012 | Bashani | |
| 2012/0191284 A1 | 7/2012 | Fehse et al. | |
| 2014/0005904 A1 | 1/2014 | Chong et al. | |
| 2014/0036076 A1 | 2/2014 | Nerayoff et al. | |
| 2014/0067207 A1 | 3/2014 | Noh | |
| 2014/0197939 A1 | 7/2014 | Stefan et al. | |
| 2015/0009047 A1 | 1/2015 | Ashkenazi et al. | |
| 2015/0081404 A1 | 3/2015 | Basir | |
| 2015/0124093 A1* | 5/2015 | Wang | G06K 9/00812 348/148 |
| 2015/0179070 A1 | 6/2015 | Sandbrook | |
| 2015/0310744 A1 | 10/2015 | Farrelly et al. | |
| 2015/0317526 A1 | 11/2015 | Muramatsu et al. | |
| 2015/0339924 A1 | 11/2015 | Cook et al. | |
| 2015/0344028 A1 | 12/2015 | Gieseke et al. | |
| 2016/0055749 A1 | 2/2016 | Nicoll et al. | |
| 2016/0061618 A1 | 3/2016 | Benenson et al. | |
| 2016/0070527 A1* | 3/2016 | Ricci | G06F 3/165 715/716 |
| 2016/0117926 A1 | 4/2016 | Akavaram et al. | |
| 2017/0076603 A1 | 3/2017 | Bostick et al. | |
| 2017/0236418 A1 | 8/2017 | Bostick et al. | |

FOREIGN PATENT DOCUMENTS

| | | |
|---|---|---|
| DE | 102012016867 | 9/2013 |
| DE | 102012108922 | 3/2014 |
| EP | 2608184 | 6/2013 |
| KR | 2014087921 | 9/2014 |

OTHER PUBLICATIONS

"Automatic Parking", http://en.wikipedia.org/wiki/Automatic_parking, Jun. 9, 2015; 2 pages.
"Intelligent Parking Assist System", http://en.wikipedia.org/wiki/Intelligent_Parking_Assist_System, Jun. 9, 2015; 5 pages.
Mell et al., "The NIST Definition of Cloud Computing", NIST, Special Publication 800-145, Sep. 2011, 7 pages.
"List of IBM Patents or Patent Applications Treated as Related" 1 page.

* cited by examiner

US 10,255,808 B2

DETERMINING A PARKING POSITION BASED ON VISUAL AND NON-VISUAL FACTORS

BACKGROUND

The present invention relates generally to autonomous (self-driving) vehicles, and more particularly, to automatic parking of autonomous vehicles.

Modern vehicle self-parking features use an array of sensors to autonomously park a vehicle in a given spot (such as alongside a curb or in an open parking spot). These systems take a number of factors into consideration such as the size of the parking spot and they work to avoid collisions with other vehicles parked close-by. However factors should be considered when autonomously parking a car in an available parking spot in order to reduce the risk of damage to the vehicle, e.g., by adjacently parked vehicles.

SUMMARY

In an aspect of the invention, a computer-implemented method includes: receiving, by a computing device, images of adjacent vehicles parked directly adjacent to an open parking space; determining, by the computing device, visual factors and non-visual factors of the adjacent vehicles based on the images by obtaining data from a dedicated database; determining, by the computing device, risk scores for each of the adjacent vehicles based on the visual factors and the non-visual factors; determining, by the computing device, a parking position within the open parking space based on the risk scores; and outputting, by the computing device, information regarding the parking position.

In another aspect of the invention, there is a computer program product for determining a parking position for a vehicle. The computer program product includes a computer readable storage medium having program instructions embodied therewith. The program instructions are executable by a computing device to cause the computing device to: receive images of adjacent vehicles parked directly adjacent to an open parking space when a user of an autonomous vehicle instructs the autonomous vehicle to park in the open parking space; determine visual factors and non-visual factors of the adjacent vehicles based on the images; determine risk scores for each of the adjacent vehicles based on the visual factors and the non-visual factors; determine a parking position within the parking space based on the risk scores; and output information regarding the parking position to the user of the autonomous vehicle or to a vehicle interface system of the autonomous vehicle to cause the autonomous vehicle to park in the open space in accordance with the determined parking position.

In another aspect of the invention, a CPU, a computer readable memory and a computer readable storage medium associated with a computing device; program instructions to receive images of adjacent vehicles parked directly adjacent to an open parking space; program instructions to determine visual factors and non-visual factors of the adjacent vehicles based on the images; program instructions to determine risk scores for each of the adjacent vehicles based on the visual factors and the non-visual factors; program instructions to determine a risk score for the open parking space based on the risk scores of each adjacent vehicle; and program instructions to output the risk score for the open parking space. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
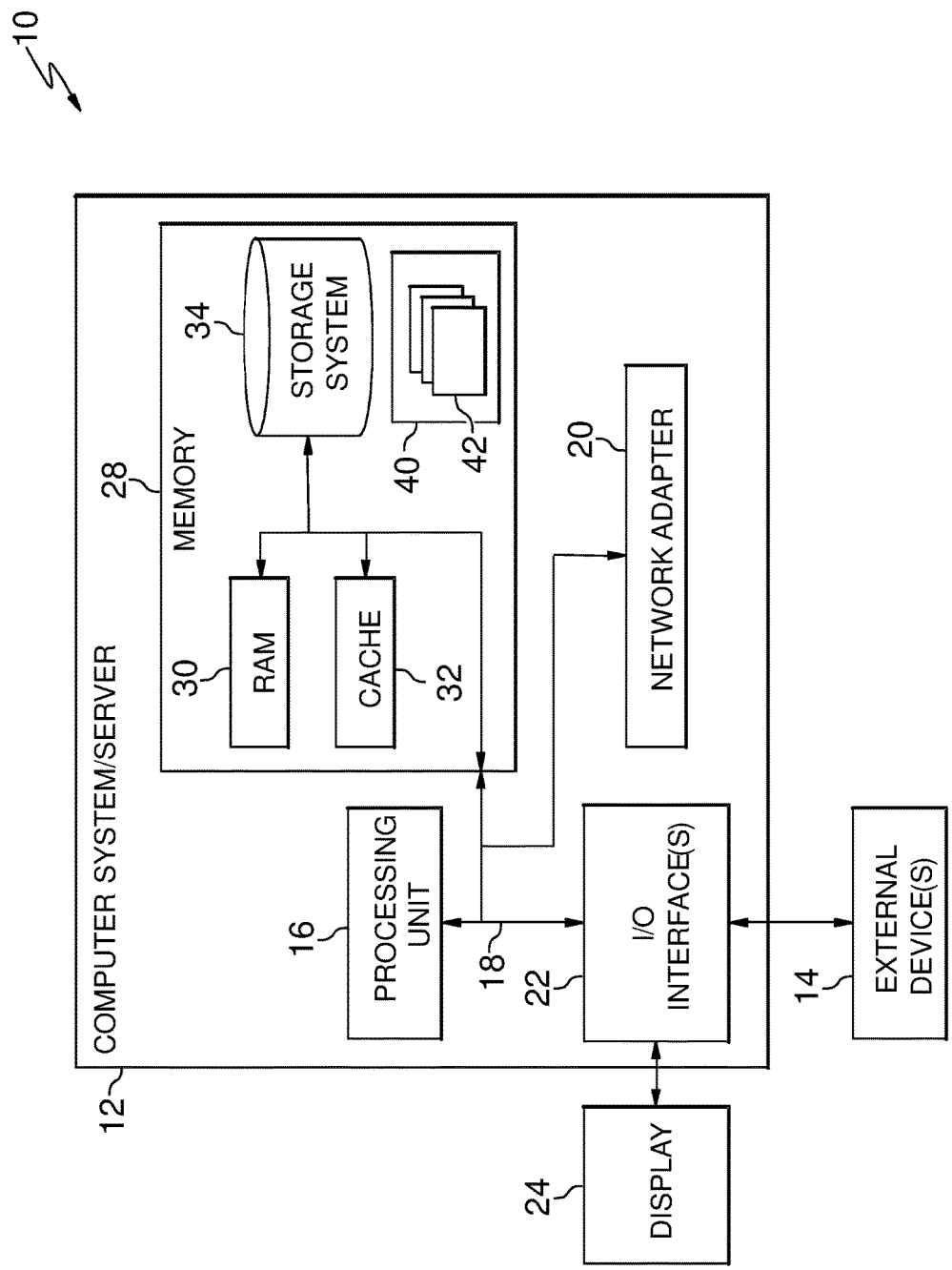
FIG. 1 depicts a cloud computing node according to an embodiment of the present invention.

The present invention relates generally to autonomous (self-driving) vehicles, and more particularly, to automatic parking of autonomous vehicles. In accordance with aspects of the present invention, visual and non-visual factors are used to determine an optimal parking position for a particular autonomous vehicle, e.g., a parking position that reduces the risk of the vehicle being damaged by surrounding vehicles parked adjacent to a vacant parking space. As in illustrative example, assume that vehicles are parked on both left and right sides of a vacant parking space that the particular autonomous vehicle is to park. The visual and non-visual factors may be used to determine risk levels for the vehicles parked adjacent to the vacant parking space. Based on the risk revels, a determination is made that the particular autonomous vehicle should park slightly more towards one of the vehicles, e.g., the vehicle having a lower risk level. As a result, the risk to the now-parked autonomous vehicle is reduced, since the autonomous vehicle is parked farther away from the higher risk vehicle.

In embodiments, visual factors used to determine the risk level for a vehicle may include the vehicle's overall size, door size, door type (sliding or non-sliding), condition, distance to an adjacent parked vehicle, etc. In embodiments, non-visual factors used to determine the risk level for a vehicle may include a vehicle or driver accident history report, driver behavior and experience information, etc.

In aspects of the present invention, an autonomous vehicle may leverage existing camera devices integrated in the autonomous vehicle to provide images to a parking position determination server. Using these images, the parking position determination server may obtain visual factors as well as non-visual factors. For example, the images can be processed using, for example, pixel-based classification techniques and/or other classification techniques to identify visual factors, such as the size of vehicles adjacent to a vacant parking space, visual damage to these vehicles, the size of the vacant space, etc. Further, images of license plates and/or other vehicle identification information can be processed using optical character recognition (OCR) techniques to obtain non-visual factors, such as vehicle or driver accident history report, driver behavior and experience information, etc.

As described herein, both visual and non-visual factors can be used to determine a risk level for each vehicle parked adjacent to a vacant parking space, and these risk levels are used to determine an optimal parking position within the vacant parking space. In an alternative embodiment, a risk score can be generated for the vacant parking space, and based on the risk score, a decision can be made as to whether the autonomous vehicle should accept the space, e.g., park in the space, or if it should decline to park in the space and search for a different space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
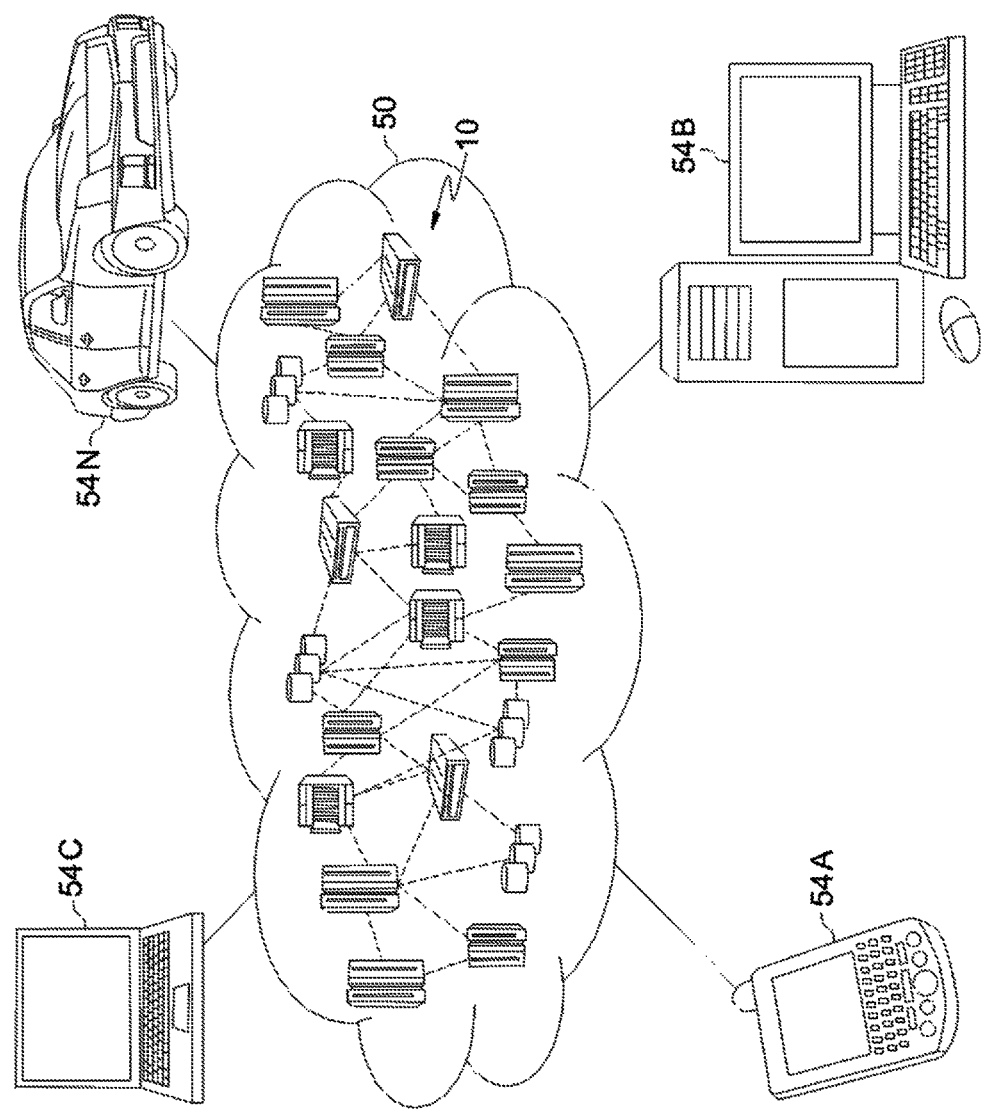
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
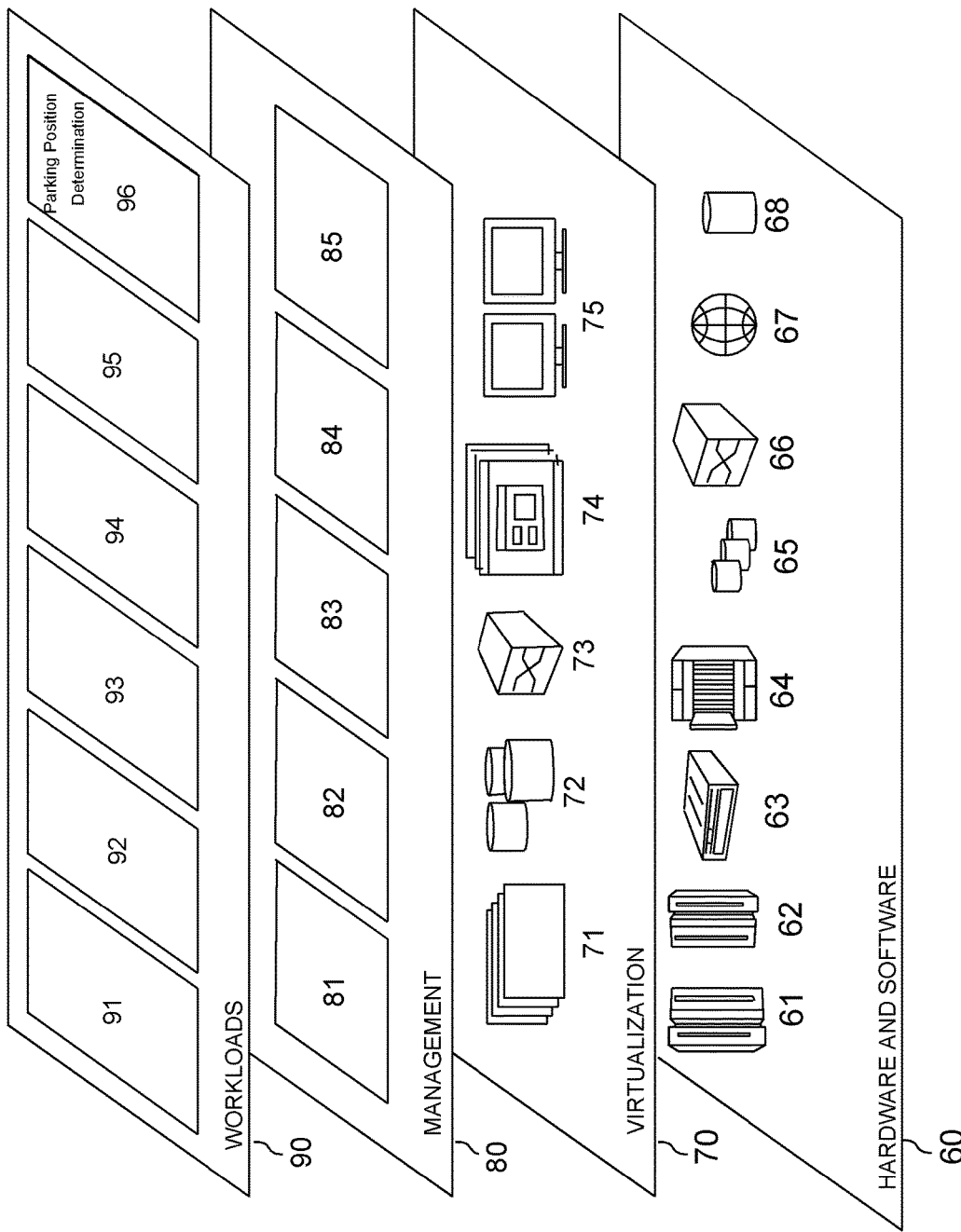
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking position determination 96.

Referring back to FIG. 1, the program/utility 40 may include one or more program modules 42 that generally carry out the functions and/or methodologies of embodiments of the invention as described herein. Specifically, the program modules 42 may receive images from an autonomous vehicle, determine visual and non-visual factors based on the images, determine a parking position for the autonomous vehicle based on the visual and non-visual factors, and output information regarding the parking position to the autonomous vehicle. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking selection server as shown in FIG. 4.

Figure 4:
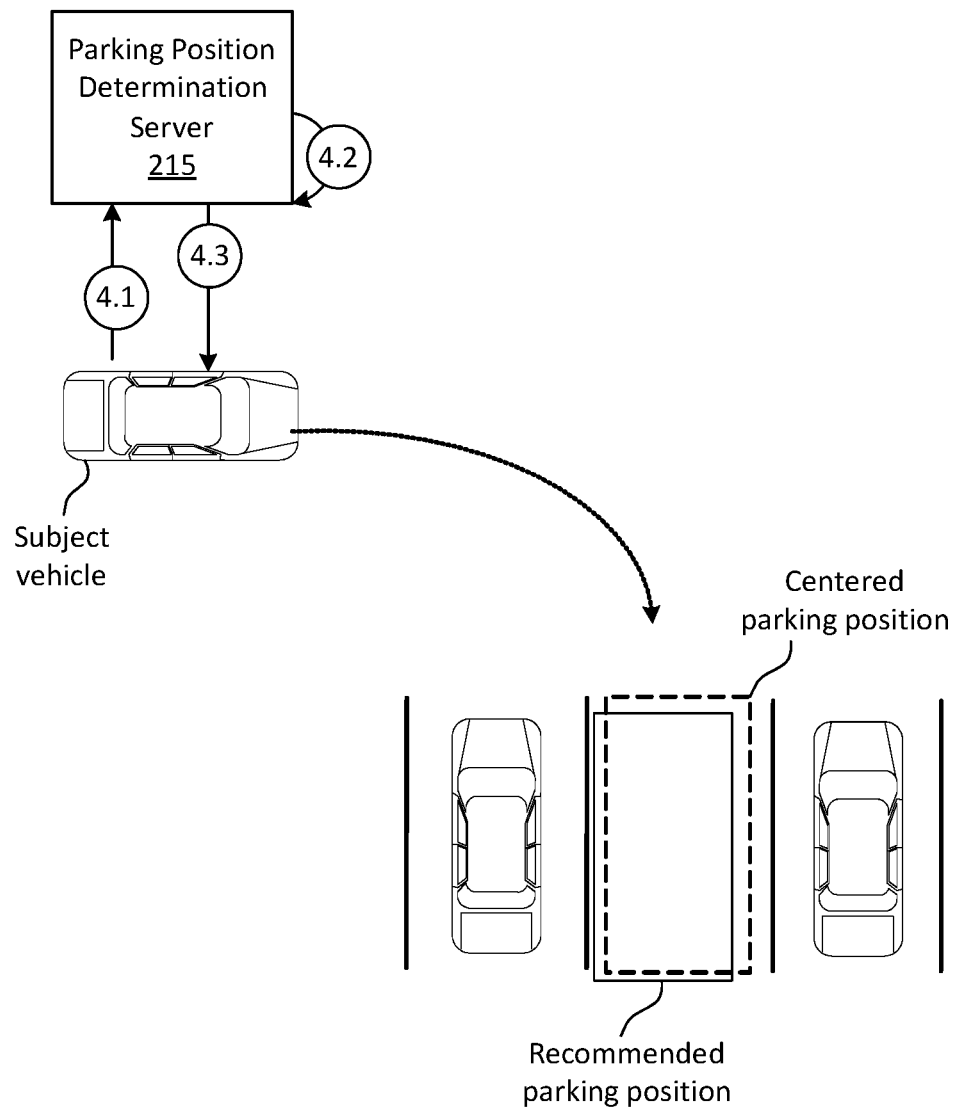
FIG. 4 shows an overview of an example implementation in accordance with aspects of the present invention

FIG. 4 shows an overview of an example implementation in accordance with aspects of the present invention. As shown in FIG. 4, a subject vehicle, e.g., an autonomous vehicle, may identify an open parking space in a parking facility. At step 4.1, the subject vehicle may provide, to a parking position determination server 215, images of the parking space and of the vehicles parked adjacent to the parking space. In embodiments, the subject vehicle may drive forward and then backward in order to capture a sufficient number of images of the parking space and the adjacent vehicles at various angles. Based on receiving these images (at step 4.2), the parking position determination server 215 may determine visual and non-visual factors for vehicles parked adjacent to the open parking space. The visual and non-visual factors may be used to determine an optimal parking position for the subject vehicle, e.g., a position that improves safety and reduces the risk of the vehicle being damaged by an adjacently parked vehicle. For example, as described herein, visual factors may include the vehicle's overall size, door size, door type (sliding or non-sliding), condition, distance to an adjacent parked vehicle etc. Non-visual factors may be obtained, for example, by analyzing vehicle identification information, e.g., a license plate number. From the vehicle identification information, non-visual factors may be determined, such as a vehicle or driver accident history report, driver behavior and experience information, etc.

It is noted that certain factors may be considered visual or non-visual. For example, published vehicle data, such as door sizes and door types, etc. can be considered either visual or non-visual since these factors may or may not be able to be visually identified from the images. However, published vehicle data can be obtained from the vehicle identification information, such as vehicle dimensions, door types, etc. This vehicle data, along with other visual and non-visual factors, can be used to determine risk levels for vehicles adjacent to a vacant parking space.

Based on determining the risk levels, a recommended parking position is determined by the parking position determination server 215, and information identifying the recommended parking position is provided to the subject vehicle (at step 4.3). For example, the recommended parking position may identify that the subject vehicle should park off-center, and slightly closer to the lower risk vehicle. The subject vehicle may then self-park in accordance with the recommended parking position. In the example shown in FIG. 4, the subject vehicle may park slightly off center and towards the adjacent vehicle on the left hand side, e.g., assuming that the adjacent vehicle on the left hand side is considered lower risk than the adjacent vehicle on the right hand side.

Figure 5:
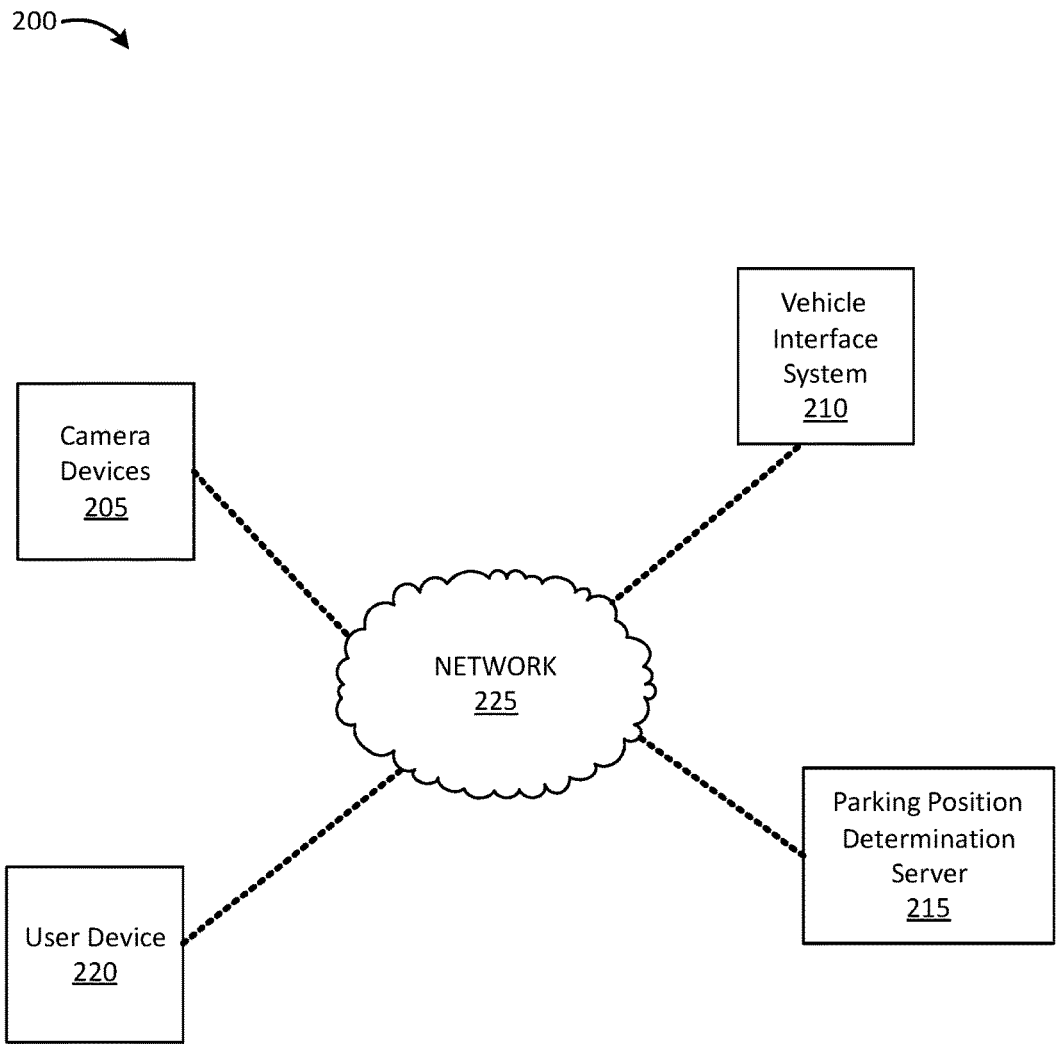
FIG. 5 shows an example environment in accordance with aspects of the present invention.

FIG. 5 shows an example environment in accordance with aspects of the present invention. As shown in FIG. 5, environment 200 may include camera devices 205, a vehicle interface system 210, a parking position determination server 215, a user device 220, and/or a network 225. In embodiments, one or more components in environment 200 may correspond to one or more components in the cloud computing environment of FIG. 2.

The camera devices 205 may be integrated into an autonomous vehicle. The camera devices 205 may capture images of an open parking space and of vehicles parked adjacent to the open parking space. Additionally, or alternatively, the camera devices 205 may be provided at a parking facility. The camera devices 205 provide images of an open parking space and of vehicles parked adjacent to the open parking space to the parking position determination server 215.

The vehicle interface system 210 may be integrated into an autonomous vehicle and receives parking position information from the parking position determination server 215. Based on receiving this information, the vehicle interface system 210 causes the autonomous vehicle to park in an open space in accordance with the parking position information. In alternative embodiments, the vehicle interface system 210 may receive a risk score for an open parking space. If the risk score is below a particular threshold, the vehicle interface system 210 causes the autonomous vehicle to park in an open space in accordance with the parking position information. If the risk score is above a particular threshold, the vehicle interface system 210 can cause the vehicle to continue to search for additional open spaces in the parking facility.

The parking position determination server 215 may include one or more computing devices, such as a cloud server, that receive images from the camera devices 205 of an autonomous vehicle. In accordance with aspects of the present invention, the parking position determination server 215 receives the images when the autonomous vehicle has identified an open parking space. Based on receiving the images, the parking position determination server 215 identifies visual and non-visual factors, and determines a parking position based on these factors.

The user device 220 may include any device capable of communicating via a network, such as the network 225. For example, the user device 220 may correspond to a mobile communication device (e.g., a smart phone or a personal digital assistant (PDA)), a portable computer device (e.g., a laptop or a tablet computer), or another type of device. In some embodiments, the user device 220 may be used to control an autonomous vehicle. For example, the user device 220 may implement an application that allows a user to select an open parking space for the autonomous vehicle to park. In embodiments, the user device 220 may receive real-video feeds from a camera device 205 associated with a parking facility, and the real-time video can be used to allow the user to select an open parking space for the autonomous vehicle to park.

The network 225 may include network nodes, such as network nodes 10 of FIG. 2. Additionally, or alternatively, the network 225 may include one or more wired and/or wireless networks. For example, the network 225 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 225 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 5. In practice, the environment 200 may include additional devices and/or networks; fewer devices and/or networks; different devices and/or networks; or differently arranged devices and/or networks than illustrated in FIG. 5. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 6:
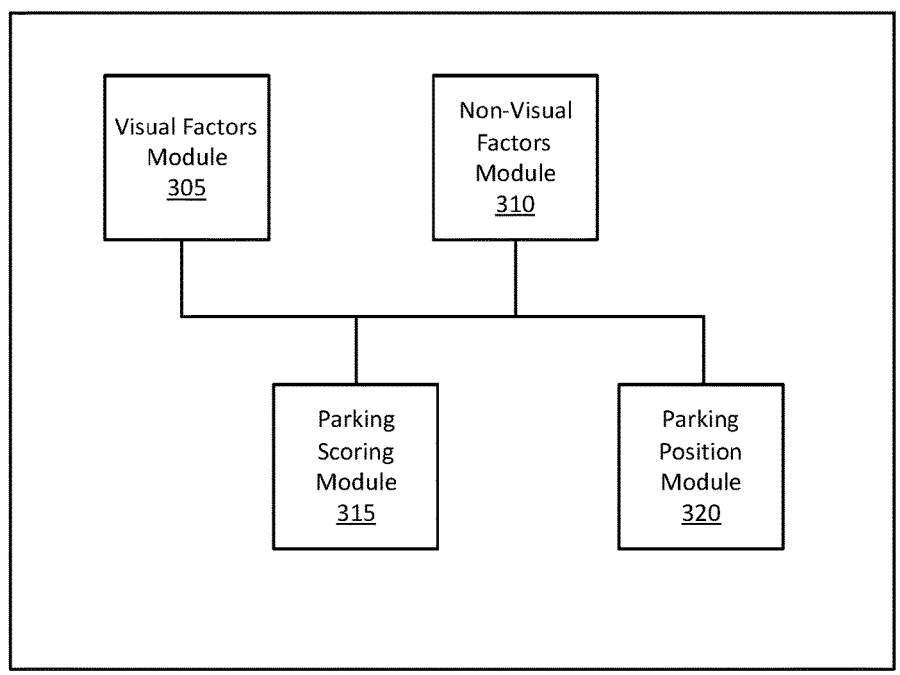
FIG. 6 shows a block diagram of example components of a parking selection server in accordance with aspects of the present invention.

FIG. 6 shows a block diagram of example components of a parking position determination server 215 in accordance with aspects of the present invention. As shown in FIG. 6, the parking position determination server 215 may include a visual factors module 305, a non-visual factors module 310, a parking scoring module 315, and a parking position module 320. In embodiments, the parking position determination server 215 may include additional or fewer components than those shown in FIG. 6. In embodiments, separate components may be integrated into a single computing component or module. Additionally, or alternatively, a single component may be implemented as multiple computing components or modules.

The visual factors module 305 may comprise a program module (e.g., program module 42 of FIG. 1) that receives, from the camera devices 205 of an autonomous vehicle and/or a parking facility, images of an open parking space and of vehicles parked adjacent to the open parking space. Based on these images, the visual factors module 305 may identify visual factors that indicate the risk level of the parked vehicles and/or an overall risk level of the open parking space. For example, the visual factors module 305 may use pixel-based classification and/or other image processing techniques to identify visual factors, such as an adjacent vehicle's overall size, door size, door type (sliding or non-sliding), condition/damage, distance to another adjacently parked vehicle, etc. In embodiments, the visual factors module 305 may identify information indicating driver experience. For example, the visual factors module 305 may identify a bumper/window sticker or other indicia that indicates is a novice driver, e.g., indicia that reads "Student Driver" or the like.

The non-visual factors module 310 may comprise a program module (e.g., program module 42 of FIG. 1) that receives, from the camera devices 205 of an autonomous vehicle and/or parking facility, images of an open parking space and of vehicles parked adjacent to the open parking space. Based on these images, the non-visual factors module 310 may identify non-visual factors that indicate the risk level of the parked vehicles and/or an overall risk level of the open parking space. For example, the non-visual factors module 310 may use optical character recognition (OCR) techniques and/or other techniques to identify vehicle identification information for the parked vehicles, such as license plates and/or other vehicle identification information. Based on the vehicle identification information, the non-visual factors module 310 may obtain non-visual factors, such as vehicle or driver accident history report, driver behavior and experience information, etc. For example, the non-visual factors module 310 may access and search a dedicated database, such as a vehicle accident database that includes driver accident history information, and/or vehicle accident history information based on the vehicle identification information, Further, the non-visual factors module 310 may access and search a vehicle registration database that includes driver experience information based on the vehicle identification information. Also based on the vehicle identification information, the non-visual factors module 310 may obtain certain factors that may be considered either visual or non-visual, such as door sizes and door types, since these factors may or may not visually apparent from the images. For example, the non-visual factors module 310 may obtain these non-visual factors by accessing and searching a vehicle information database.

The parking scoring module 315 may comprise a program module (e.g., program module 42 of FIG. 1) that generates a score for each vehicle parked directly adjacent to an open parking space based on the visual and non-visual factors. The score identifies a measure of risk associated with each adjacent vehicle. As an illustrative example, the score would indicate a relatively riskier adjacent vehicle if the adjacent vehicle has visual damage, is parked relatively close to the open parking space, has relatively large doors, and/or whose driver has a relatively poor driving record (e.g., a relatively higher number of accidents, relatively low amount of driving experience, etc.) In alternative embodiments, the parking scoring module 315 may generate a score for the open parking space. The score for the open parking space may be based on the score of the vehicles parked directly adjacent to the open parking space. In embodiments, the score for the open parking space can be provided to a user device 220 and/or a vehicle interface system 210 associated with an autonomous vehicle. If the score does not satisfy a particular threshold, a user of the autonomous vehicle (or the autonomous vehicle itself) may decline to park in the parking space. In embodiments, each visual and/or non-visual factor may be weighted, and the score may be based on these weightings. For example, visual damage can be weighted differently than door clearance, and driver accident history can be weighted differently than the size of the open parking space.

The parking position module 320 may comprise a program module (e.g., program module 42 of FIG. 1) that determines an optimum parking position within the open parking space based on the risk scores of the vehicles parked directly adjacent to the open space. For example, the parking position module 320 may determine that the autonomous vehicle should park off-center and closer to the adjacent vehicle that has the lower risk score. The parking position module 320 may provide information identifying the parking position to the vehicle interface system 210 of the autonomous vehicle. Based on receiving the parking position information, the vehicle interface system 210 may direct the autonomous vehicle to park in the parking space in accordance with the determined parking position.

Figure 7:
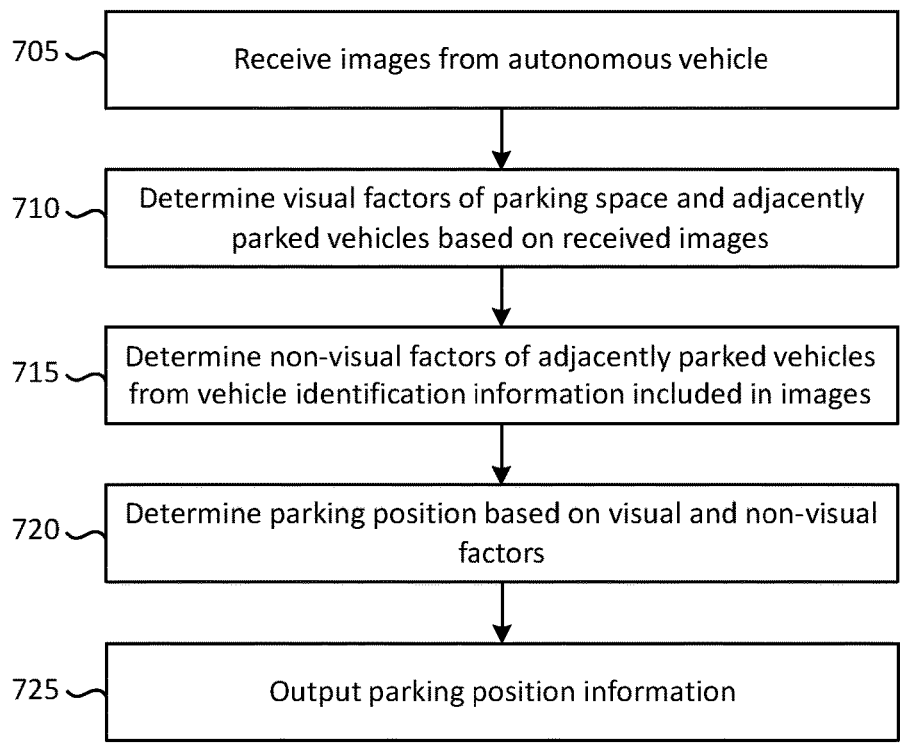
FIG. 7 shows an example flowchart for selecting a parking space based on parking space attributes, driver preferences, and vehicle attributes in accordance with aspects of the present invention.

FIG. 7 shows an example flowchart for determining and outputting parking position information. The steps of FIG. 7 may be implemented in the environment of FIG. 1, for example. As noted above, the flowchart illustrates the architecture, functionality, and operation of possible implementations of systems, methods, and computer program products according to various embodiments of the present invention.

At step 705, images from an autonomous vehicle are received. For example, the parking position determination server 215 receives the images when the autonomous vehicle has identified an open parking space. In embodiments, the autonomous vehicle can identify an open parking space based on object sensing and/or pixel-based classification techniques. In embodiments, the autonomous vehicle may identify the open parking space when automatically driving and searching for an open parking in a parking facility. Additionally, or alternatively, the autonomous vehicle may identify the open parking space when a user of the autonomous vehicle has remotely instructed the autonomous vehicle, e.g., using a user device 220, to park in an open parking space.

In an alternative embodiment, the images can be received from another source other than an autonomous vehicle. For example, the images can be received from camera devices 205 implemented in a parking facility.

At step 710, visual factors of the parking space and of vehicles parked directly adjacent to the parking space are determined based on the received images. For example, the parking position determination server 215 may identify visual factors that indicate the risk level of the parked vehicles and/or an overall risk level of the open parking space. For example, the visual factors module 305 may identify visual factors, such as an adjacent vehicle's overall size, door size, door type (sliding or non-sliding), condition/damage, distance to another adjacently parked vehicle, etc.

At step 715, non-visual factors of the adjacently parked vehicles are determined from vehicle identification information included in the images. For example, the parking position determination server 215 may use OCR techniques and/or other techniques to identify vehicle identification information for the parked vehicles, such as license plates and/or other vehicle identification information. Based on the vehicle identification information, the non-visual factors module 310 may obtain non-visual factors, such as vehicle or driver accident history report, driver behavior and experience information, etc. Also based on the vehicle identification information, the non-visual factors module 310 may obtain certain factors that may be considered either visual or non-visual, such as door sizes and door types, since these factors may or may not visually apparent from the images.

At step 720, a parking position is determined based on the visual and non-visual factors. For example, the parking position determination server 215 may determine the parking position by scoring the adjacently parked vehicles in terms of risk levels. As an illustrative example, the score would indicate a relatively riskier adjacent vehicle if the adjacent vehicle has visual damage, is parked relatively close to the open parking space, has relatively large doors, and/or whose driver has a relatively poor driving record (e.g., a relatively higher number of accidents, relatively low amount of driving experience, etc.). The parking position determination server 215 may determine a parking position that the autonomous vehicle should park in the open parking space based on the risk scores of the vehicles parked directly adjacent to the open space. For example, the parking position determination server 215 may determine that the autonomous vehicle should park off-center and closer to the adjacent vehicle that has the lower risk score.

At step 725, the parking position information is outputted. For example, the parking position determination server 215 may output the parking position information to the vehicle interface system 210 of the autonomous vehicle. Based on receiving the parking position information, the vehicle interface system 210 may direct the autonomous vehicle to park in the parking space in accordance with the determined parking position. In alternative embodiments, the parking position determination server 215 may output the parking position information to a user device 220 associated with a controller of parking autonomous vehicle. Alternatively, the parking position determination server 215 may output the parking position information to a user device 220 associated with driver of a parking, non-autonomous vehicle.

Figure 8:
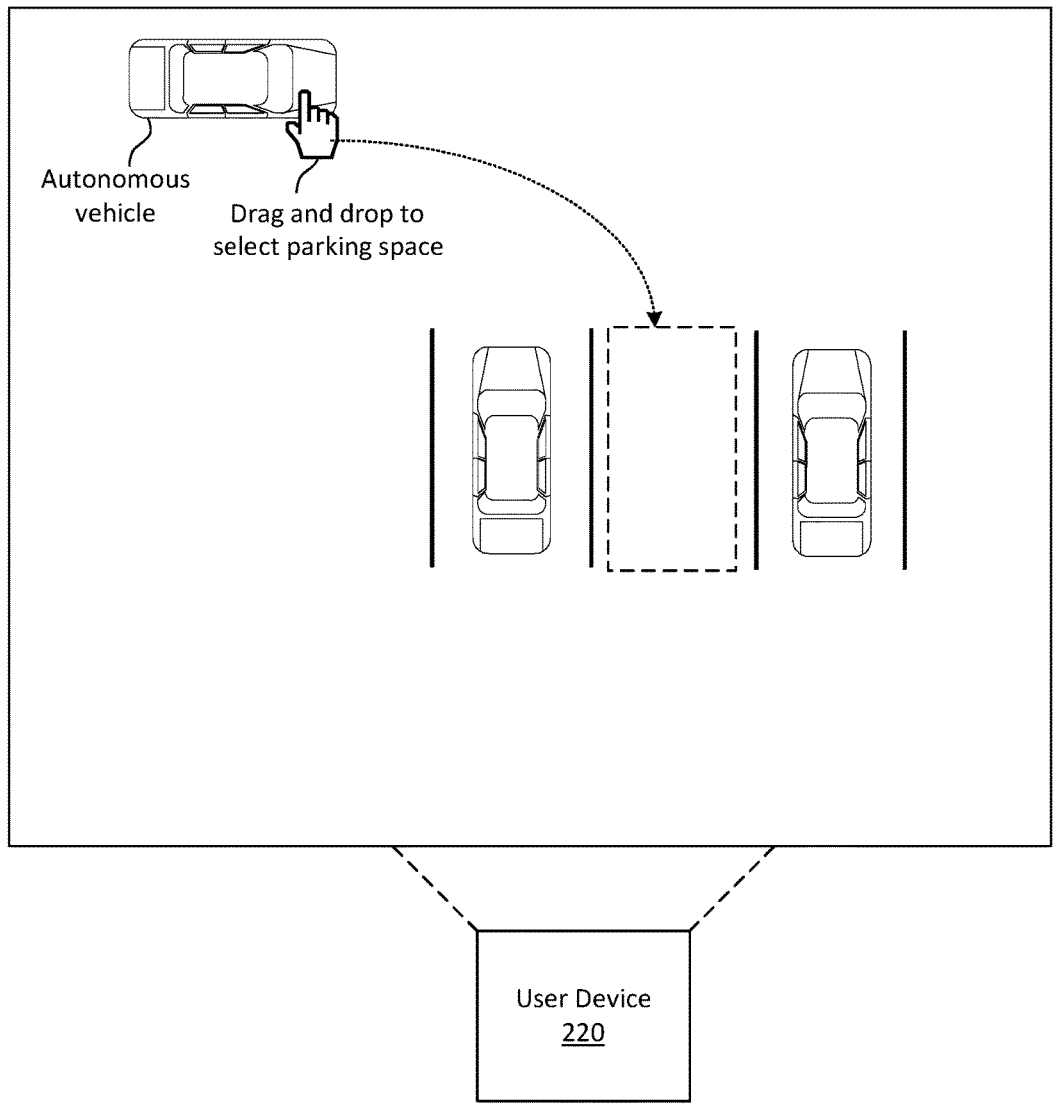
FIG. 8 shows an example user interface in accordance with aspects of the present invention.

FIG. 8 illustrates an example user interface for controlling an autonomous vehicle in accordance with alternative aspects of the present invention. As shown in FIG. 8, a user device 220 may display a diagram or a video of a parking facility, e.g., in an application that can be used to select a parking space for an autonomous vehicle. For example, a camera device 205 associated with the parking facility may provide the video to the user device 220, and the user device 220 may identify open parking spaces in the parking facility based on the video data. A user of the user device 220 may instruct the autonomous vehicle to park in a particular open parking space, e.g., by dragging and dropping an icon or object representing the autonomous vehicle to an area representing the open space. For example, based on the dragging and dropping, the user device 220 provides an instruction to the vehicle interface system 210 of the autonomous vehicle. The autonomous vehicle may then drive to the open parking space, and capture images of the parking space and of the vehicles parked directly adjacent to the parking space, e.g., using the camera devices 205 of the autonomous vehicle. As described herein, the images are provided to the parking position determination server 215, and the parking position determination server 215 may determine a parking position within the parking space for the autonomous vehicle. The autonomous vehicle may receive the parking position information from the parking position determination server 215, and park in the parking space in accordance with the parking position information. In alternative embodiments, information identifying a risk score of the parking space may be displayed on the user device 220, e.g., based on previously determining the risk score using visual and/or non-visual factors, as described herein. Additionally, or alternatively, colors representing the risk score can be visually displayed. In embodiments, the risk score can be presented as a number and/or a letter, e.g., a risk score of A represents a relatively low risk whereas risk scores of B, C, and D represent incrementally higher risk scores.

While aspects of the invention have been described in an environment including autonomous vehicles, in an alternative embodiment, aspects of the present invention may be used to provide optimal parking position information to a driver of a standard (non-autonomous) vehicle. For example, while images can be received by the parking position determination server from cameras of an autonomous vehicle, in an alternative embodiment, the images can be received by other cameras, such as cameras that monitor a parking facility. In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for determining an optimal parking position, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a CPU, a computer readable memory and a computer readable storage medium associated with a computing device;
   program instructions to receive images of a plurality of adjacent vehicles parked directly adjacent to an open parking space;
   program instructions to determine visual factors and non-visual factors of the plurality of adjacent vehicles based on the images by obtaining data from a dedicated database;
   program instructions to determine a parking position within the open parking space based on the visual and non-visual factors; and
   program instructions to output information regarding the parking position,
   wherein the program instructions are stored on the computer readable storage medium for execution by the CPU via the computer readable memory.

2. The system of claim 1, wherein the images are received from one or more camera devices implemented in an autonomous vehicle.

3. The system of claim 1, wherein the parking position is closer to one of the plurality of adjacent vehicles having visual factors and non-visual factors indicating a lower risk than another one of the plurality of adjacent vehicles.

4. The system of claim 1, wherein the determining the non-visual factors is based on vehicle identification information included in the images.

5. The system of claim 1, wherein the images are received from one or more camera devices associated with a parking facility.

6. The system of claim 1, wherein the visual factors include one or more of:
   overall vehicle size;
   door size;
   door type;
   condition; and
   distance to another adjacent parked vehicle.

7. The system of claim 1, wherein the non-visual factors include one or more of:
   vehicle history information;
   accident history information; and
   published vehicle data.

8. The system of claim 1, wherein at least one of the visual and the non-visual factors are weighted.

9. The system of claim 1, further comprising:
   program instructions to determine a risk score for the open parking space based on the visual and non-visual factors of each adjacent vehicle of the plurality of adjacent vehicles; and
   program instructions to output the risk score for the open parking space.

10. A computer-implemented method comprising:
    receiving, by a computing device, images of a plurality of adjacent vehicles parked directly adjacent to an open parking space when a user of an autonomous vehicle instructs the autonomous vehicle to park in the open parking space;
    determining, by the computing device, visual factors and non-visual factors of the plurality of adjacent vehicles based on the images;
    determining, by the computing device, a parking position within the parking space based on the visual factors and non-visual factors; and
    outputting, by the computing device, information regarding the parking position to the user of the autonomous vehicle or to a vehicle interface system of the autonomous vehicle to cause the autonomous vehicle to park in the open space in accordance with the determined parking position.

11. The method of claim 10, wherein the parking position is closer to one of the plurality of adjacent vehicles having visual factors and non-visual factors indicating a lower risk than another one of the plurality of adjacent vehicles.

12. The method of claim 10, wherein the program instructions to determine the non-visual factors cause the computing device to determine the non-visual factors based on vehicle identification information included in the images.

13. The method of claim 10, wherein the visual factors include one or more of:
    overall vehicle size;
    vehicle door size;
    vehicle door type;
    vehicle condition;
    driver experience information; and
    distance to another adjacent parked vehicle.

14. The method of claim 10, wherein the non-visual factors include one or more of:
    vehicle history information;
    driver accident history information;

driver behavior information;
driver experience information; and
published vehicle data.

15. The method of claim 10, wherein a service provider at least one of creates, maintains, deploys and supports the computing device.

16. The method of claim 10, wherein the receiving the images, the determining the visual factors and the non-visual factors, the determining the parking position, and the outputting the information regarding the parking position are provided by a service provider on a subscription, advertising, and/or fee basis.

17. The method of claim 10, wherein the computing device includes software provided as a service in a cloud environment.

18. The method of claim 10, further comprising deploying a system for selecting a parking space and providing navigation direction to the selected parking space, comprising providing a computer infrastructure operable to perform the receiving the images the determining the visual factors and the non-visual factors, the determining the parking position, and the outputting the information regarding the parking position.

19. A computer program product for selecting a parking space and providing navigation direction to the selected parking space, the computer program product comprising a computer readable storage medium having program instructions embodied therewith, the program instructions executable by a computing device to cause the computing device to:

receive images of adjacent vehicles parked directly adjacent to an open parking space;

determine visual factors and non-visual factors of the adjacent vehicles based on the images;

determine a risk score for the open parking space based on the visual factors and non-visual factors of each adjacent vehicle; and output the risk score for the open parking space.

20. The computer program product of claim 19, wherein the program instructions further cause the computing device to:

determine a parking position within the parking space based on the visual factors and non-visual factors; and output information regarding the parking position.

\* \* \* \* \*